(12) United States Patent
Pichaimurthy et al.

(10) Patent No.: US 12,343,638 B2
(45) Date of Patent: Jul. 1, 2025

(54) SYSTEMS AND METHODS FOR PROVIDING RECOMMENDATIONS TO IMPROVE GAMEPLAY

(71) Applicant: Adeia Guides Inc., San Jose, CA (US)

(72) Inventors: Rajendran Pichaimurthy, Karnataka (IN); Dolphin Masilamany Santha, Karnataka (IN); Prakash Viswanathan, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/745,369

(22) Filed: May 16, 2022

(65) Prior Publication Data

US 2023/0104352 A1    Apr. 6, 2023

Related U.S. Application Data

(63) Continuation of application No. 16/985,717, filed on Aug. 5, 2020, now Pat. No. 11,358,062.

(51) Int. Cl.
| | |
|---|---|
| *A63F 13/798* | (2014.01) |
| *A63F 13/35* | (2014.01) |
| *A63F 13/533* | (2014.01) |
| *A63F 13/77* | (2014.01) |
| *G06Q 30/0601* | (2023.01) |
| *A63F 13/22* | (2014.01) |

(52) U.S. Cl.
CPC ............ *A63F 13/77* (2014.09); *A63F 13/35* (2014.09); *A63F 13/533* (2014.09); *A63F 13/798* (2014.09); *G06Q 30/0631* (2013.01); *A63F 13/22* (2014.09); *A63F 2300/1018* (2013.01); *A63F 2300/308* (2013.01); *A63F 2300/552* (2013.01); *A63F 2300/558* (2013.01)

(58) Field of Classification Search
None
See application file for complete search history.

(56) References Cited

U.S. PATENT DOCUMENTS

| | | | |
|---|---|---|---|
| 8,360,866 | B2 | 1/2013 | Van |
| 8,874,705 | B1 | 10/2014 | Satish |
| 10,649,875 | B2 | 5/2020 | Vichare et al. |
| 11,358,062 | B2 | 6/2022 | Pichaimurthy et al. |
| 2010/0045660 | A1 | 2/2010 | Dettinger et al. |
| 2013/0288759 | A1 | 10/2013 | Rom et al. |

(Continued)

FOREIGN PATENT DOCUMENTS

| | | |
|---|---|---|
| CN | 111459540 A | 7/2020 |

OTHER PUBLICATIONS

PCT International Search Report for International Application No. PCT/US2020/067214, dated Apr. 30, 2021 (6 pages).

*Primary Examiner* — Jay Trent Liddle
(74) *Attorney, Agent, or Firm* — Haley Guiliano LLP

(57) ABSTRACT

Systems and methods are described for recommending a proposed hardware configuration to a first user in response to determining that a performance aspect of the first user having a first hardware configuration playing a multiplayer game is worse than a performance aspect of a second user having a second hardware configuration jointly playing the multiplayer game. The proposed hardware configuration is generated based on the first hardware configuration and the second hardware configuration and caused to be displayed on a device of the first user.

20 Claims, 7 Drawing Sheets

(56) References Cited

U.S. PATENT DOCUMENTS

| | | |
|---|---|---|
| 2014/0162775 A1 | 6/2014 | Hawver et al. |
| 2016/0253865 A1 | 9/2016 | Men et al. |
| 2017/0282063 A1 | 10/2017 | Krishnamurthy |
| 2018/0256982 A1 | 9/2018 | Kuneida et al. |
| 2019/0168123 A1 | 6/2019 | Webster et al. |
| 2019/0303416 A1 | 10/2019 | Kunieda et al. |
| 2019/0391898 A1 | 12/2019 | Vichare et al. |
| 2020/0030702 A1* | 1/2020 | Benedetto ............ A63F 13/5375 |
| 2020/0391119 A1 | 12/2020 | Lebrun et al. |
| 2021/0069588 A1 | 3/2021 | Perry et al. |
| 2022/0040585 A1 | 2/2022 | Pichaimurthy et al. |

\* cited by examiner

700

| Hardware Configuration/Gaming Advantage | |
|---|---|
| Display [Response Time] | |
| -Above 7ms | +0 |
| -Between 3-7ms | +2 |
| -Below 3ms | +4 |
| Memory [Amount] | |
| -Below 4GB | +0 |
| -Between 4-16GB | +5 |
| -Above 16GB | +7 |
| Gaming Controller [Type] | |
| -Keyboard | +0 |
| -Mouse | +1 |
| -Joystick | +1 |
| -Xbox Elite Controller | +4 |
| Internet Connection [Speed] | |
| -10Mbps-25Mbps | +0 |
| -25Mbps-50Mbps | +11 |
| -50Mbps-100Mbps | +13 |
| -Above 100Mbps | +13 |
| Processor [Speed] | |
| -Less than 1GHz | +0 |
| -Between 1GHz-2.3GHz | +2 |
| -Above 2.3GHz | +3 |
| Gaming Device [Type] | |
| -Smartphone | +0 |
| -Desktop Computer | +5 |
| -Xbox | +7 |

FIG. 7

SYSTEMS AND METHODS FOR PROVIDING RECOMMENDATIONS TO IMPROVE GAMEPLAY

CROSS-REFERENCE TO RELATED APPLICATION(S)

This application is a continuation of U.S. patent application Ser. No. 16/985,717, filed Aug. 5, 2020, the disclosure of which is incorporated by reference in its entirety.

BACKGROUND

The present disclosure relates to systems for hardware configuration recommendations and, more particularly, to systems and related processes for recommending hardware configurations to improve gameplay in a video game.

SUMMARY

Many video games, such as multiplayer online video games, require a gaming device with a specific set of parameters for playing the video game. For example, the specific set of parameters may include certain minimum hardware requirements and internet connection speed requirements to play the video game. If a user uses a gaming device with optimized parameters (e.g., a high-speed CPU, a display with a fast response time, a fast internet connection, etc.) they may have an advantage against other users with gaming devices having parameters that are not optimized (e.g., parameters that only meet the minimum requirements for playing the video game). It may be cost-prohibitive, however, for a user to upgrade all the parameters of their gaming device. Further, a user may not know which parameters affect gameplay for a certain video game and, therefore, should be upgraded to improve gameplay. Still further, a user may not realize that other users playing the same video game have an advantage because of an optimized gaming device.

Accordingly, it would be advantageous to provide a user with specific hardware configuration recommendations to improve their gaming device, based on the gaming devices of other users that the user plays the video game with (or against), so that the user may upgrade parameters of their gaming device and not be at a disadvantage to other user they are playing the video game with. The present disclosure provides systems and related methods that recommending hardware configurations to improve a user's gameplay in the video game by analyzing game performance of a first user having a first hardware configuration and a second user having a second hardware configuration who are jointly playing a multiplayer game. In response to determining that a performance aspect of the first user in the multiplayer game is worse than the performance aspect of the second user in the multiplayer game, a proposed hardware configuration for the first user is generated based on the first hardware configuration of the first user and the second hardware configuration of the second user, and a recommendation proposal comprising the proposed hardware configuration is caused to be displayed on a device of the first user.

In some embodiments, the recommendation proposal may include an identity of the second user.

In some embodiments, the proposed hardware configuration may include a proposed hardware upgrade of the device of the first user.

In some embodiments, the generating of the proposed hardware configuration for the first user, based on the first hardware configuration of the first user and the second hardware configuration of the second user may include comparing the first hardware configuration with the second hardware configuration, determining a difference between the first hardware configuration and the second hardware configuration, and generating the proposed hardware configuration for the first user based on the difference.

In some embodiments, the difference between the first hardware configuration and the second hardware configuration may include a hardware component being used by the second user that is not being used by the first user, and wherein the proposed hardware configuration for the first user comprises the hardware component.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 depicts a table, which includes different possible hardware configurations and a corresponding gaming advantage in the multiplayer game, in accordance with some embodiments of the disclosure.

DETAILED DESCRIPTION

Figure 1:
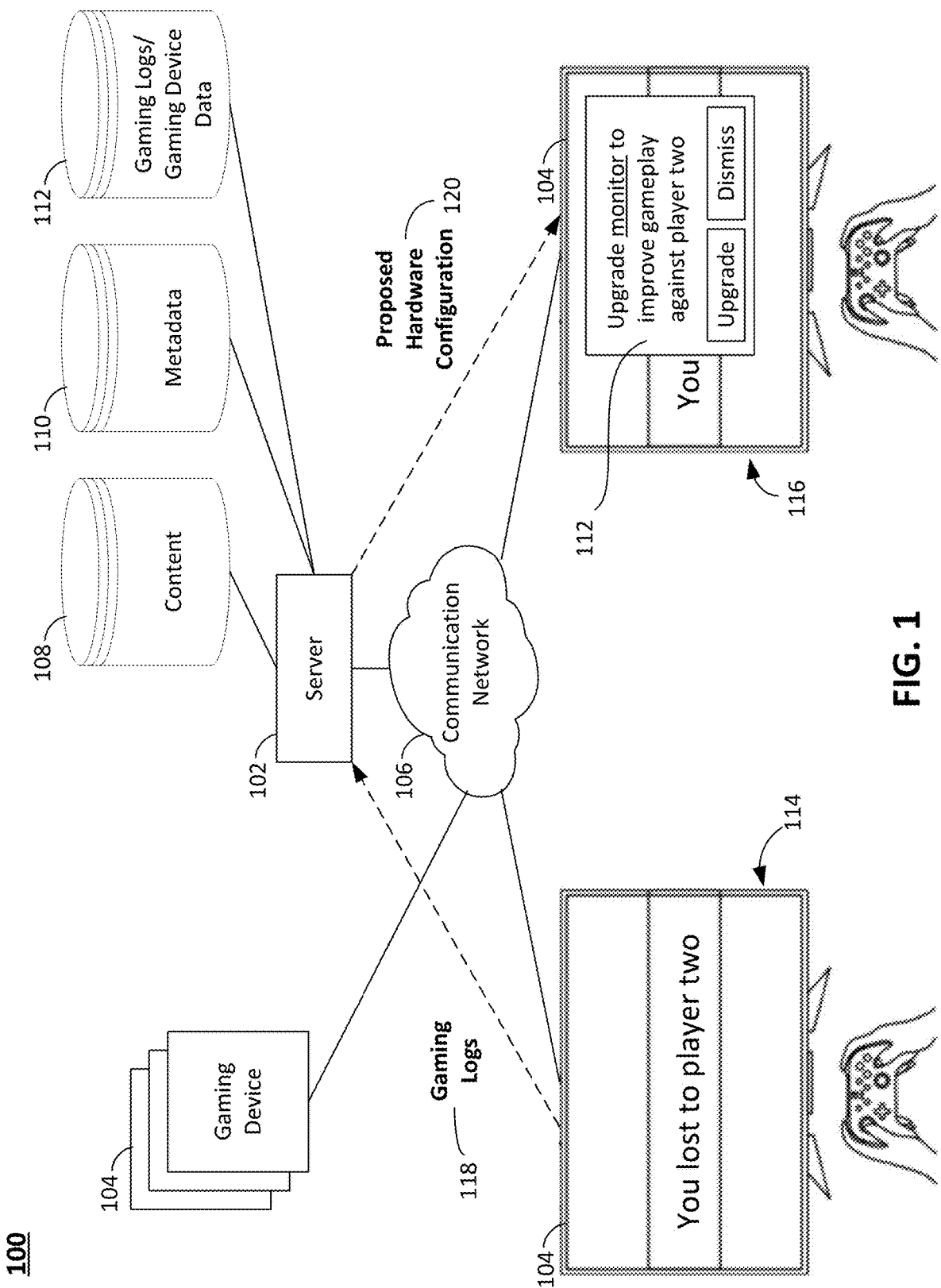
FIG. 1 shows an illustrative block diagram of a system for recommending a hardware configuration to improve gameplay in a video game, in accordance with some embodiments of the disclosure.

FIG. 1 shows an illustrative block diagram of a system 100 for recommending a hardware configuration to improve gameplay in a video game, in accordance with some embodiments of the disclosure. System 100 includes server 102, gaming devices 104, communication network 106, content source 108, metadata database 110, and gaming logs/gaming device data database 112. Server 102 is communicatively coupled to gaming devices 104 by way of communication network 106 and is communicatively coupled to content source 108, metadata database 110, and gaming logs/gaming device data database 112 by way of additional communication paths, which may be included in communication network 106 or may be separate from communication network 106. Communication network 106 may be any type of communication network, such as the Internet, a mobile phone network, mobile voice or data network (e.g., a 4G or LTE network), cable network, public switched telephone network, or any combination of two or more of such communication networks. Communication network 106 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 106 communicatively couples various components of system 100 to one another.

Server 102 is configured to aggregate, from gaming devices 104 over communication network 106, gaming logs 118 generated based on user performance in video games using gaming devices 104 while logged into user accounts. Gaming logs 118 may be pushed by gaming devices 104 to server 102 and/or pulled by server 102 from gaming devices 104. Gaming logs 118 may include, for example, user data, game data, device data of gaming device 104, and gameplay data. However, this is only one example, and certain data may be communicated separately from the gaming logs 118. For example, user data may be retrieved from a database when a user logs into their account. Game data may include the details of the video game that a user is playing (e.g., name, version, etc.). The video game may be any online multiplayer game such a massively multiplayer online role-playing game (MMORPG), a mobile online battle arena multiplayer (MOBA) video game, a massively multiplayer online game (MMOG), etc. Device data of gaming device 104 may include a hardware profile and a software profile of the gaming device, as well as a peripheral profile (e.g., of external peripheral devices currently connected to the gaming device). The hardware profile may include information about each of the hardware components that are installed in the gaming device 104 (e.g., CPU, GPU, Graphics card, RAM, ROM, etc.). In some embodiments, the information about the hardware components may include a model number or other identifier of the hardware components. In some embodiments, the information about the hardware components may include performance metrics of the hardware components when playing the video game. The software profile may include information about the operating system installed on gaming device 104, as well as any other software installed on gaming device 104. The peripheral profile may include information about peripherals (e.g., monitors, gaming controllers, input devices, speakers, etc.) that are currently connected to gaming device 104. Gameplay data may include information about pre-game performance metrics (e.g., prior to the current or most recent gaming session) and in-game performance metrics (e.g., of the current gaming session). The pre-game and in-game performance metrics measure the performance of a player in a video game (e.g., data indicating particular video games played, levels of those video games, successes and failures at challenges in video games, as well as characters, scenes, sports, levels completed, kills, time to complete levels, health data, ammunition used, deaths, challenges completed, or any other game-specific performance metrics to measure player performance against other players).

Content source 108 may store data including video game content, which includes player data corresponding to the video game. In one example, the video game content includes player data such as aggregated pre-game and in-game metrics for each of the first and second user (e.g., FIG. 6). The pre-game and in-game metrics will be described in greater detail below with respect to FIG. 6. In some embodiments, the video game content may be included in gaming logs 118 and stored in gaming logs/gaming device data database 112.

Metadata database 110 may store metadata of a game map and parameters of the video gameplay. Some of the parameters include character positioning, the route followed, reaction time, objective captures, target elapsed in objective capturing and target destroyed, and any other game-specific parameters to analyze user performance. Gaming logs/gaming device data database 112 may store gaming logs 118, which may include device data of gaming devices 104 (e.g., hardware profiles of gaming devices 104).

Server 102 is configured to detect when a first user of their gaming device 104 has lost against a second user (e.g., "player two") of another gaming device 104 during a session of a video game (e.g., an online video game), and would thus benefit from receiving a hardware recommendation to improve their gaming device 104. For instance, in view 114, upon the first user of their gaming device 104 losing against the second user of another gaming device 104 during the session of the video game, the server 102 determines if gaming device 104 of the second user has a hardware advantage with respect to gaming device 104 of the first user that affects gameplay of the video game. For example, server 102 may compare the device data of gaming devices 104 of the first and second users. If a difference is detected, the detected difference may be, e.g., compared to aggregate data for a large number of other gaming devices 104 and associated gameplay data to determine if the detected difference affects gameplay. In response to determining that gaming device 104 of the second user has a hardware advantage that affects gameplay of the video game, server 102 is configured to provide or recommend to the first user via their gaming device 104 (or any other device of the user), a recommendation proposal comprising a hardware configuration recommendation 120 to improve the gameplay of the first user using gaming device 104. For example, server 102 may search content source 108, metadata database 110, gaming logs/gaming device data database 112, and/or gaming logs 118 to determine the hardware configuration recommendation 120 and provide, to gaming device 104 of the first user over communication network 106, a selectable recommendation, such as the pop-up window 122 in view 116, that the first user may select to view the hardware configuration recommendation 120. In some embodiments, the selectable recommendation may provide a link to a recommended hardware component (e.g., an upgraded monitor). In some embodiments, the recommendation may include a settings change for a hardware component (e.g., "increase the sensitivity of your Joystick"). Additional details regarding the features and functionality of system 100 are provided below.

Figure 2:
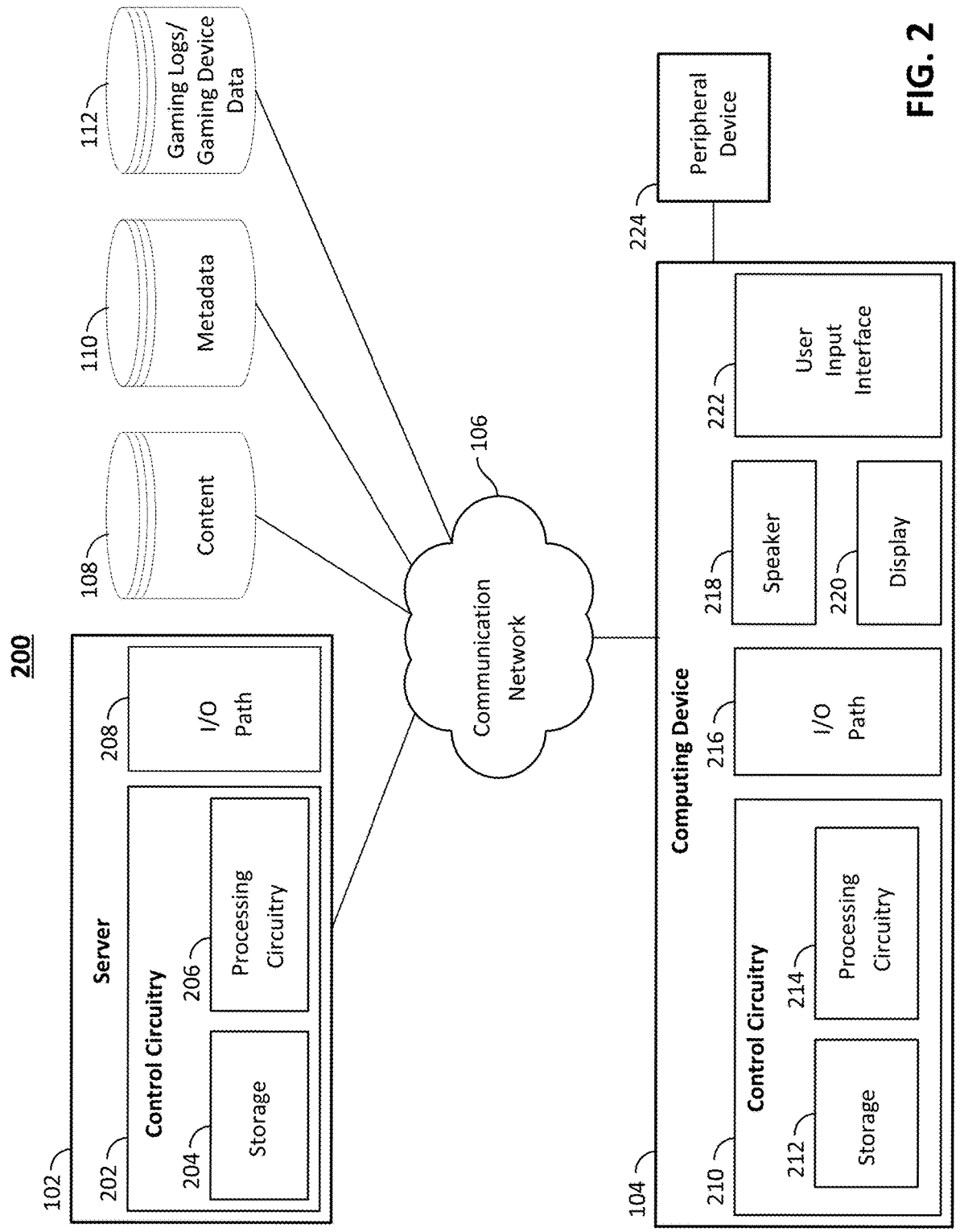
FIG. 2 shows an illustrative block diagram showing additional details of the system in FIG. 1, in accordance with some embodiments of the disclosure.

FIG. 2 shows an illustrative block diagram showing additional details of system 100 (FIG. 1), in accordance with some embodiments of the disclosure. In various embodiments, system 200 includes some components described above in connection with system 100. Although FIG. 2 shows certain numbers of components, in various examples, system 200 may include fewer than the illustrated components and/or multiples of one or more illustrated components. Server 102 includes control circuitry 202 and I/O path 208, and control circuitry 202 includes storage 204 and processing circuitry 206. Computing device 104, which may correspond to gaming devices 104 of FIG. 1, may be a gaming device, such as a video game console, user television equipment such as a set-top box, user computer equipment, a wireless user communications device such as a smartphone device, or any device on which video games may be played. Computing device 104 includes control circuitry 210, I/O path 216, speaker 218, display 220, and user input interface 222. Computing device 104 may optionally include external peripheral device 224 (e.g., gaming controller) connected by wired or wireless means (e.g., by I/O path 216). Control circuitry 210 includes storage 212 and processing circuitry 214. Control circuitry 202 and/or 210 may be based on any suitable processing circuitry such as processing circuitry 206 and/or 214. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 204, storage 212, and/or storages of other components of system 200 (e.g., storages of content source 108, metadata database 110, gaming logs/gaming device data database 112, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 204, storage 212, and/or storages of other components of system 200 may be used to store various types of content, metadata, gaming data, media guidance data, game device profile data, and or other types of data. Non-volatile memory may also be used (e.g., to launch a boot-up routine and other instructions). Cloud-based storage may be used to supplement storages 204, 212 or instead of storages 204, 212. In some embodiments, control circuitry 202 and/or 210 executes instructions for an application stored in memory (e.g., storage 204 and/or 212). Specifically, control circuitry 202 and/or 210 may be instructed by the application to perform the functions discussed herein. In some implementations, any action performed by control circuitry 202 and/or 210 may be based on instructions received from the application. For example, the application may be implemented as software or a set of executable instructions that may be stored in storage 204 and/or 212 and executed by control circuitry 202 and/or 210. In some embodiments, the application may be a client/server application where only a client application resides on computing device 104, and a server application resides on server 102.

The application may be implemented using any suitable architecture. For example, it may be a stand-alone application wholly implemented on computing device 104. In such an approach, instructions for the application are stored locally (e.g., in storage 212), and data for use by the application is downloaded on a periodic basis (e.g., from an out-of-band feed, from an Internet resource, or using another suitable approach). Processing circuitry 214 may retrieve instructions for the application from storage 212 and process the instructions to perform the functionality described herein. Based on the processed instructions, processing circuitry 214 may determine what action to perform when input is received from user input interface 222 (or from external peripheral device 224).

In client/server-based embodiments, control circuitry 210 may include communication circuitry suitable for communicating with an application server (e.g., server 102) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 106). In another example of a client/server-based application, control circuitry 210 runs a web browser that interprets web pages provided by a remote server (e.g., server 102). For example, the remote server may store the instructions for the application in a storage device. The remote server may process the stored instructions using circuitry (e.g., control circuitry 202) and generate the displays discussed above and below. Computing device 104 may receive the displays generated by the remote server and may display the content of the displays locally via display 220. This way, the processing of the instructions is performed remotely (e.g., by server 102) while the resulting displays, such as the display windows described elsewhere herein, are provided locally on computing device 104. Computing device 104 may receive inputs from the user via input interface 222 and transmit those inputs to the remote server for processing and generating the corresponding displays.

A user may send instructions to control circuitry 202 and/or 210 using user input interface 222 (or external peripheral device 224). User input interface 222 may be any suitable user interface, such as a gaming controller, a remote control, trackball, keypad, keyboard, touchscreen, touchpad, stylus input, joystick, voice recognition interface, or other user input interfaces (e.g., such as external peripheral device 224). External peripheral device 224 may function as user input interface 222 as described herein, but is shown as an external peripheral device for understanding. User input interface 322 may be integrated with or combined with display 220, which may be a monitor, a television, a liquid crystal display (LCD), an electronic ink display, or any other equipment suitable for displaying visual images.

Server 102 and computing device 104 may receive content and data via input/output (hereinafter "I/O") paths 208 and 216, respectively. For instance, I/O path 216 may include a communication port configured to receive a live content stream (e.g., video game stream) from server 102 and/or content source 108 via a communication network 106. Storage 212 may be configured to buffer the received live content stream for playback, and display 220 may be configured to present the buffered content, navigation options, alerts, and/or the like via a primary display window and/or a secondary display window. I/O paths 208, 216 may provide content (e.g., a live stream of content, video game content, broadcast programming, on-demand programming, Internet content, content available over a local area network (LAN) or wide area network (WAN), and/or other content) and data to control circuitry 202, 210. Control circuitry 202, 210 may be used to send and receive commands, requests, and other suitable data using I/O paths 208, 216. I/O paths 208, 216 may connect control circuitry 202, 210 (and specifically processing circuitry 206, 214) to one or more communication paths (described below). I/O functions may be provided by one or more of these communication paths but are shown as single paths in FIG. 2 to avoid overcomplicating the drawing.

Content source 108 may include one or more types of content distribution equipment, including video game servers, television distribution facility, cable system headend, satellite distribution facility, programming sources, etc. Content and/or data delivered to computing device 104 may be over-the-top (OTT) content. OTT content delivery allows Internet-enabled user devices, such as computing device 104, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 104.

Figure 3:
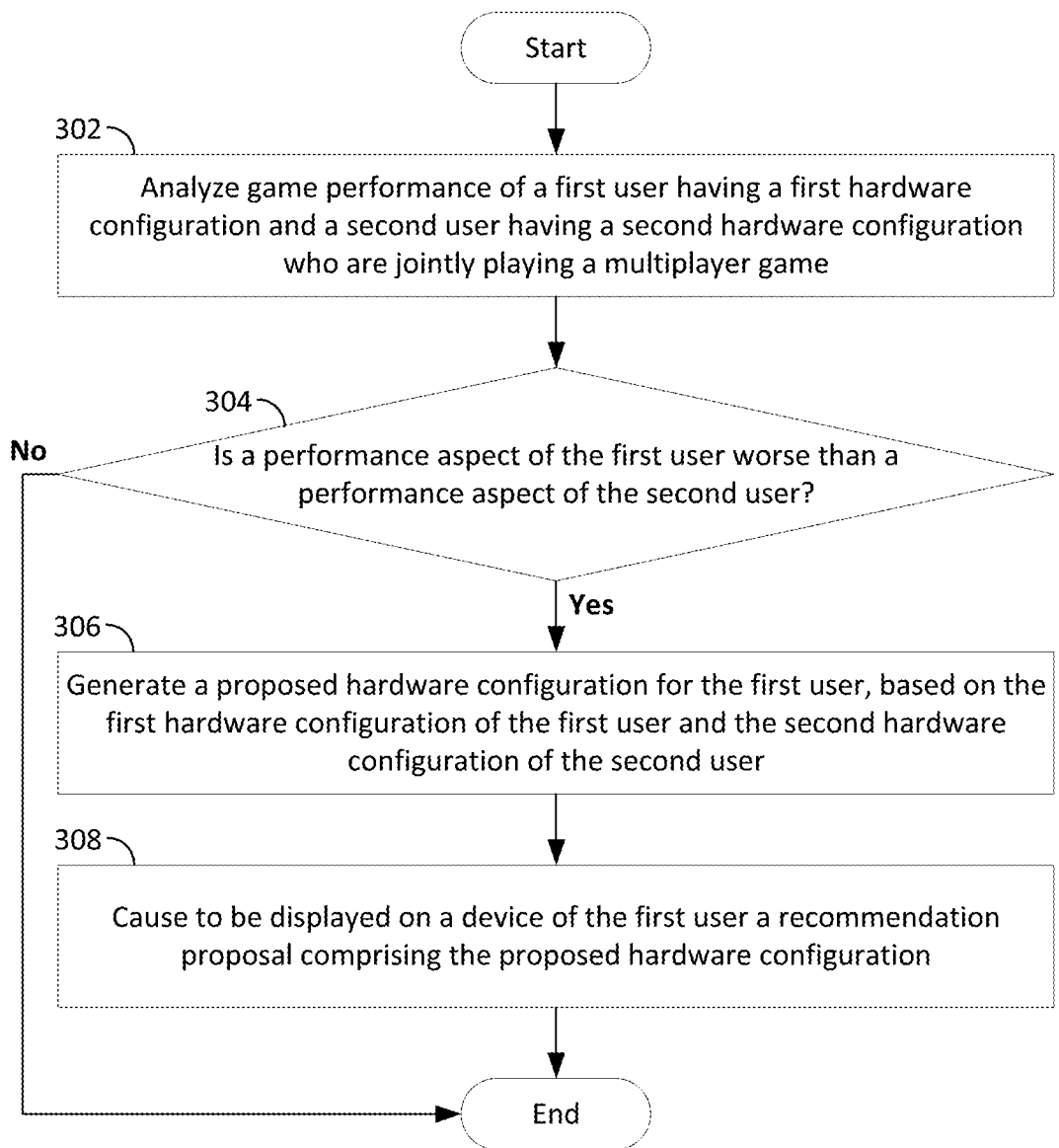
FIG. 3 depicts an illustrative flowchart of a process for recommending a hardware configuration to improve gameplay in a video game, in accordance with some embodiments of the disclosure.

Having described system 100, reference is now made to FIG. 3, which depicts an illustrative flowchart of process 300 for recommending a hardware configuration to improve gameplay in a video game that may be implemented by using system 200, in accordance with some embodiments of the disclosure. In various embodiments, individual steps of process 300, or any process described herein, may be implemented by one or more components of system 200. Although the present disclosure may describe certain steps of process 300 (and of other processes described herein) as being implemented by certain components of system 200, this is for purposes of illustration only, and it should be understood that other components of system 200 may implement those steps instead.

At 302, control circuitry 202 analyzes game performance of a first user having a first hardware configuration (e.g., the hardware configuration of the first user's gaming device 104) and of a second user having a second hardware configuration (e.g., the hardware configuration of the first user's gaming device 104) who are jointly playing a multiplayer game (e.g., an online multiplayer game). For example, control circuitry 202 may analyze game performance included in gaming logs 118 (e.g., received from the gaming device 104). However, this is only one example, and control circuitry 202 may analyze game performance of the first user and of another user selected by the first user. For example, the first user may select another player in the multiplayer game (e.g., a friend or tournament competitor) who they have not yet jointly played the multiplayer game with. Additional details on how control circuitry 202 may analyze game performance at 302 are provided below in connection with FIG. 4.

At 304, control circuitry 202 determines if a performance aspect of the first user is worse than a performance aspect of the second user (in the multiplayer game). There may be various aspects to performance in a video game. For example, all, none, or only some performance aspects of the first user may be worse than of the second user. In some cases, different performance aspects may be assigned weights based on their relative importance in the multiplayer game to calculate a composite score for each of the first and second users. In some cases, the first and the second user may be playing against each other, and the performance aspect used in the determination may be based on the number of times each of the players was killed by the other player in the multiplayer game. In some cases, the first and the second user may be playing on the same team and their respective performance in the multiplayer game (e.g., number of kills, response time, points earned, levels reached, treasures found, gameplay duration, structures built, deaths, health data, ammunition used, deaths, challenges completed, or any other game-specific performance metrics to measure player performance against other players) may be used in the determination. If a performance aspect of the first user is not worse than a performance aspect of the second user ("NO" at 304), then the procedure terminates. If a performance aspect of the first user is worse than a performance aspect of the second user ("YES" at 304), then control is passed to 306.

At 306, control circuitry 202 generates a proposed hardware configuration for the first user (e.g., hardware configuration recommendation 120), based on the first hardware configuration of the first user and the second hardware configuration of the second user. For example, control circuitry 202 may compare the first hardware configuration to the second hardware configuration, determine differences that affect gameplay in the multiplayer game, and generate the proposed hardware configuration for the first user based on these determined differences. The proposed hardware configuration may include a new peripheral (e.g., gaming controller) or a replacement peripheral for gaming device 104 of the first user, new or replacement hardware components of gaming device 104 of the first user, or an entirely new gaming device. Additional details on how control circuitry 202 may generate the proposed hardware configuration for the first user are provided below in connection with FIG. 5.

At 308, control circuity 202 causes to be displayed on a device of the first user (e.g., gaming device 104) a recommendation proposal including the proposed hardware configuration. For example, control circuity 202 transmits the recommendation proposal to gaming device 104 of the first user (e.g., by communication network 106) for presentation to the first user (e.g., via a pop-up window, such pop-up window 122 in view 116 in FIG. 1). In some embodiments, the recommendation proposal may include the identity of the second user (e.g., "The second user is using a joystick that provides an advantage in the game. We recommend upgrading to a joystick"). In some embodiments, the identity of the second user may include the second user's screen name in the video game (e.g., "Steve007"). In some embodiments, if the second user is a friend of the first user, the identity of the second user may include the second user's actual name, along with a more general hardware recommendation (e.g., "Dennis beats you in this level 90% of the time. You would improve your chances if you upgraded to the same monitor as Dennis because the refresh rate of your monitor is not optimal for playing the game."). The recommendation proposal may also include a link to the proposed hardware configuration. In some embodiments, sponsored products may be included in the proposed hardware configuration. In some embodiments, the proposed hardware configuration may include a recommendation for a setting change of a hardware component (e.g., "All of your teammates in the last level set the sensitivity of their handheld controller to six. Your current sensitivity might be too high"). In some embodiments, the recommendation proposal may be provided on a periodic basis (e.g., once a week). The periodic basis may be adjusted based on, e.g., an amount of user gameplay, user skill level, or other in-game characteristics. In some embodiments, control circuitry 202 may monitor environmental factors (e.g., time of day, location, duration of gameplay, etc.) to determine parameters for providing the recommendation proposal. In some embodiments, the recommendation proposal may be provided based on the time-sensitivity of the recommendation proposal. For example, urgent recommendation proposals (e.g., based on a poor internet connection) may be provided immediately, while other recommendation proposals (e.g., based on monitor differences) may be provided at a time that minimizes interruptions of user gameplay.

In will be understood that while process 300 was described in the content of a hardware configuration recommendation, process 300 (and the processes described below) may be used for providing any type of recommendation that affects gameplay (e.g., software configuration recommendations, settings recommendations, in-game character recommendations, etc.). For example, in some embodiments, software configurations of the gaming devices of the first and the second user may be compared to provide a software configuration recommendation to one of the first and the second user. In some embodiments, in-game characteristics (e.g., avatars) of the first and the second user may be compared to provide in-game configuration recommendations (e.g., avatar upgrades) to one of the first and the second user. For example, in-game configuration recommendations may include offers to buy avatar upgrades to improve gameplay (e.g., improved health, weapons, etc.). In some embodiments, a user may buy or borrow avatar upgrades from other users through a marketplace. For example, users may be provided with recommendations to either buy/sell avatar upgrades or other in-game attributes to/from other users. In some embodiments, it may be advantageous to automatically adjust in-game settings and gaming device setting to optimize gameplay. In some embodiments, it may be advantageous to automatically adjust in-game settings and/or gaming device settings to compensate for a hardware advantage of one of the gaming devices during a video game session. For example, in-game settings and/or gaming device settings of the gaming device determined to have a superior hardware configuration may be adjusted to remove any advantage provided by the superior hardware configuration. In some embodiments, the in-game settings and/or gaming device settings may be adjusted automatically (e.g., during a tournament) to compensate for hardware advantages of any gaming device. In some embodiments, users with gaming devices having similar hardware configurations may be paired in the same video game session or recommended to play against each other in the same video game session (e.g., "You keep losing to player two. You would have a better chance of beating player two if you upgraded to the same monitor as player two. Otherwise, we recommend that you play against player three who has the same monitor as you.").

Figure 4:
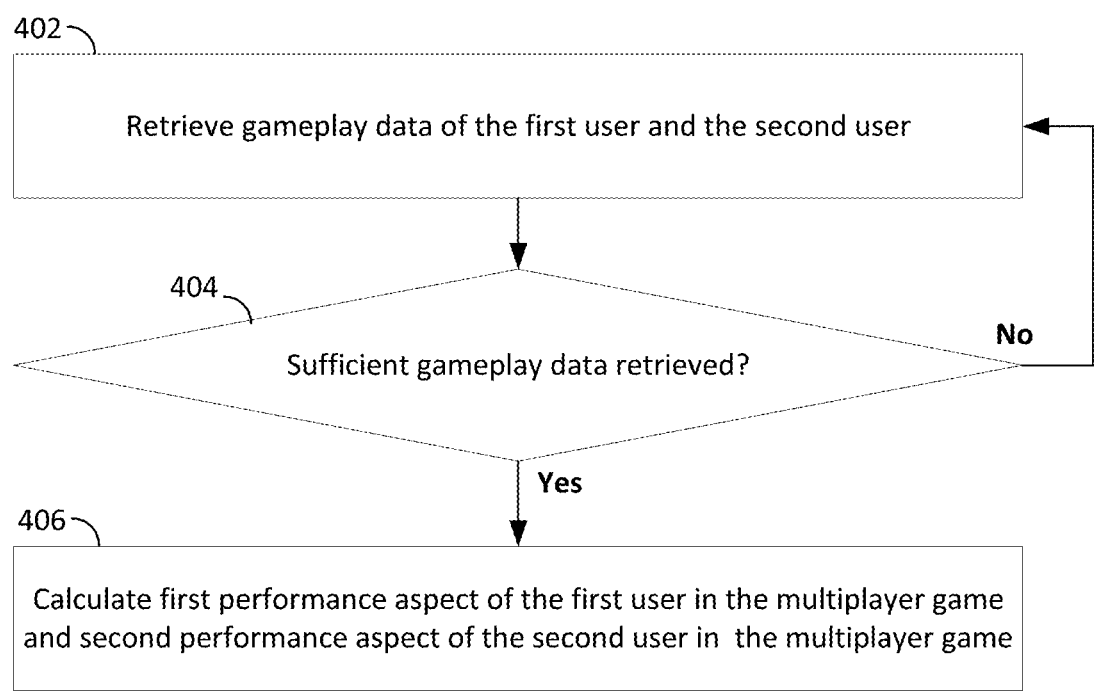
FIG. 4 depicts an illustrative flowchart of a process for analyzing game performance of the first user and the second user to determine if a performance aspect of the first user is worse than a performance aspect of the second user, in accordance with some embodiments of the disclosure.

FIG. 4 depicts an illustrative flowchart of process 400 for analyzing game performance of the first user and the second user to determine if a performance aspect of the first user is worse than a performance aspect of the second user (in the multiplayer game), in accordance with some embodiments of the disclosure. Process 400, in various embodiments, may correspond to step 302 of FIG. 3.

At 402, control circuitry 202 retrieves gameplay data of the first user and the second user. For example, control circuitry 202 retrieves gaming logs (e.g., gaming logs 118 in FIG. 1) from the gaming devices of the first user and the second user (e.g., gaming devices 104 in FIG. 1) who are jointly playing a session in a multiplayer video game. In some embodiments, control circuitry 202 retrieves gameplay data stored in a memory (e.g., gaming logs/gaming device data database 112 of FIG. 1).

At 404, control circuitry 202 determines if sufficient gameplay data has been retrieved. For example, in order to limit the recommendations that are provided to a user and improve the accuracy of the recommendations that are provided, control circuitry 202 may compare the retrieved gameplay data to a threshold value (e.g., a certain number of video game sessions, a certain number of hours played, etc.). In some embodiments, the threshold value is preset and may be changed by a user. If sufficient gameplay data has not been retrieved ("NO" at 404), control may return to 402 to retrieved additional gameplay data. Otherwise, if sufficient gameplay data has been retrieved ("YES" at 404), control is passed to 406.

At 406, control circuitry calculates a first performance aspect of the first user in the multiplayer game and a second performance aspect of the second user in the multiplayer game, based on the retrieved gameplay data. For example, control circuitry 202 may calculate an aggregated performance score for the first and the second user from the last (current) session of the first and the second user. For example, control circuitry 202 may calculate the aggregated performance score 602 shown in FIG. 6. In some embodiments, the aggregated performance score may be calculated across multiple video game sessions. Although aggregated performance scores are discussed, the calculated first performance aspect and the second performance aspect may be based on any aspect of gameplay. For example, the calculated performance aspect may be based on a single metric (e.g., "kills") or multiple metrics (e.g., "kills" and "accuracy"). In some embodiments, metrics used in the calculated performance aspects may be selected by a user. In some embodiments, the metrics are preset by the video game or the control circuitry 202. In some embodiments, the metrics are changed based on user feedback.

Figure 5:
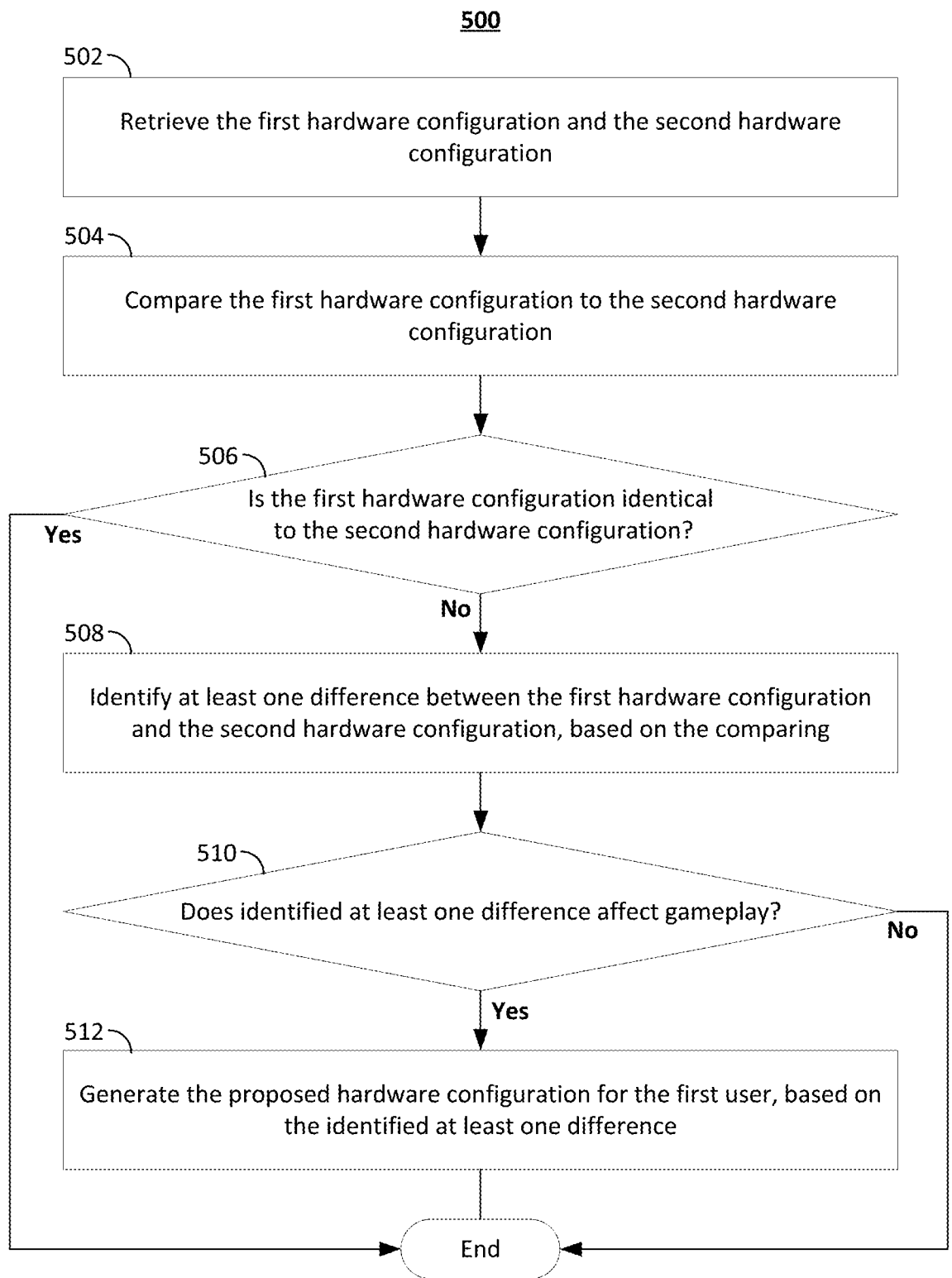
FIG. 5 depicts an illustrative flowchart of a process for generating a proposed hardware configuration for the first user, in accordance with some embodiments of the disclosure.

FIG. 5 depicts an illustrative flowchart of process 500 for generating a proposed hardware configuration for the first user, in accordance with some embodiments of the disclosure. Process 500, in various embodiments, may correspond to step 304 of FIG. 3.

At 502, control circuitry 202 retrieves the first hardware configuration and the second hardware configuration. For example, control circuitry 202 retrieves gaming logs (e.g., gaming logs 118 in FIG. 1) from the gaming devices of the first user and the second user (e.g., gaming devices 104 in FIG. 1). In some embodiments, control circuitry 202 may simply retrieve the first hardware configuration and the second hardware configuration from the gaming logs retrieved at 402. In some embodiments, control circuitry 202 may retrieve the first hardware configuration and the second hardware configuration from device data stored in a memory (e.g., gaming logs/gaming device data database 112 of FIG. 1).

At 504, control circuitry 202 compares the first hardware configuration to the second hardware configuration. For example, control circuitry 202 may compare hardware components installed in the gaming devices, peripherals that are currently connected to the gaming devices, and settings associated with the hardware components and peripherals. For example, control circuitry 202 may compare device data discussed above with reference to FIG. 1 or the hardware discussed below with reference to FIG. 7. However, these are only examples, and the control circuitry 202 may compare any aspect of the first hardware configuration and the second hardware configuration (e.g., aspects of the platform: CPU, GPU, operating system/kernel dependencies, RAM/memory, etc.; aspects of gameplay controls: mouse, keyboard, joystick, touch, gesture control, handheld control, etc.; aspect of connection: Internet speed, throughput, stability, etc.).

At 506, control circuitry 202 determines if the first hardware configuration is identical to the second hardware configuration. If the first hardware configuration is identical to the second hardware configuration ("YES" at 506), then the procedure terminates. If the first hardware configuration is not identical to the second hardware configuration ("NO" at 304), then control is passed to 508.

At 508, control circuitry 202 identifies at least one difference between the first hardware configuration and the second hardware configuration, based on the comparison at 504. For example, control circuitry 202 may determine that the first hardware configuration and the second hardware configuration have different monitors. For example, the first hardware configuration may include a monitor with a response time of 8 ms and the second hardware configuration with a response time of 2 ms.

At 510, control circuitry 202 determines if the identified at least one difference affects gameplay. For example, the control circuitry 202 may compare the identified at least one difference data to performance data associated with hardware configurations of a large number of gaming devices (e.g., table 700 in FIG. 7). In some embodiments, the identified at least one difference may be compared to data provided with the video game (e.g., stored in the metadata database 110 in FIG. 1). If the identified at least one difference does not affect gameplay ("NO" at 510), then the procedure terminates. However, this is only one example, and if multiple differences are identified, control circuitry 202 may determine if any of the multiple differences affect gameplay before the procedure terminates. If the identified at least one difference does affect gameplay ("YES" at 510), then control is passed to 512. For example, with reference to table 700 in FIG. 7, control circuitry 202 may determine that the monitor of the second hardware configuration provides a "+4" gaming advantage compared to the monitor of the first hardware configuration. If, however, the identified at least one difference does not affect gameplay in the advantage of the second user, the procedure may terminate instead of proceeding to 512 to generate the proposed hardware configuration for the first user.

At 512, control circuitry 202 generates the proposed hardware configuration for the first user, based on the identified at least one difference. For example, the proposed hardware configuration may include a recommendation for the monitor of the second hardware configuration (e.g., "You lost to player two. You would have a better chance of beating player two if you upgraded to the same monitor as player two. Would you like more information about the monitor of player two?").

Figure 6:
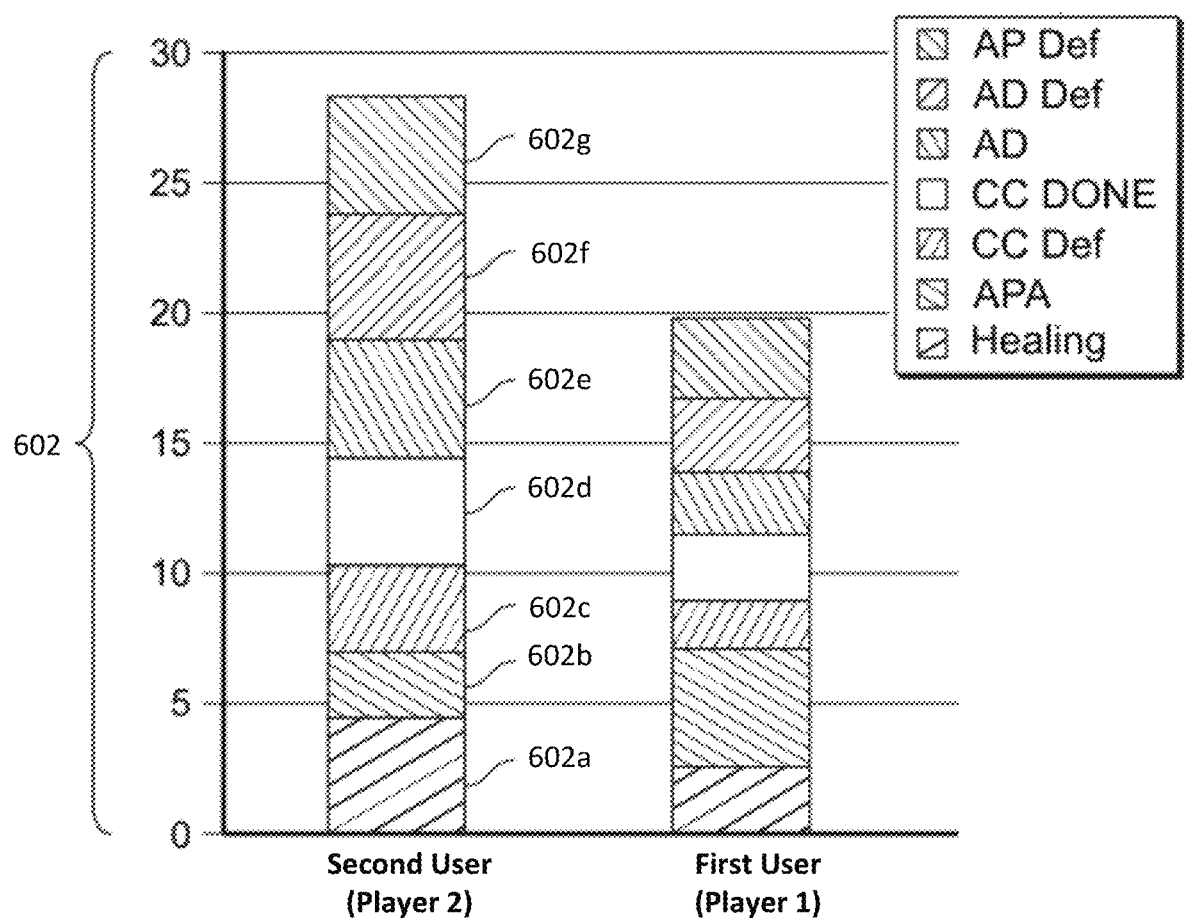
FIG. 6 depicts a graph illustrating game analysis of the first and the second user from the same session of a video game, in accordance with some embodiments of the disclosure.

FIG. 6 depicts a graph 600 illustrating game analysis (e.g., pre-game analysis and/or in-game analysis) of the first and the second user from the same session of a video game, in accordance with some embodiments of the disclosure. As shown, the x-axis includes two users (players), the first user and the second user and the y-axis illustrates aggregated performance scores 602 of the first and the second users for the session of the video game. Although only two users are shown, this is only one example and any number of users greater than or equal to two may be included in graph 600. As shown, aggregated performance score 602 may include game-specific performance metrics. For example, when the video game is a MOBA video game (e.g., LEAGUE OF LEGENDS), aggregated performance score 602 includes ability power (AP) defense (Def) score 602a, attack damage (AD) Def score 602b, attack damage (AD) score 602c, crowd control (CC) Done score 602d, CC Def score 602e, aggregate power attack (APA) score 602f and healing score 602g of each of the first and the second users. However, this is only one example, and aggregated performance score 602 may include more or fewer performance metrics (e.g., game-specific metrics). As shown, aggregated performance score 602 for the first user may be approximately twenty, while aggregated performance score 602 for the second user may be approximately twenty-six (e.g., higher than the first user). In some embodiments, the game performance may correspond to multiple gaming sessions.

FIG. 7 depicts table 700, which includes different possible hardware configurations and a corresponding gaming advantage in the multiplayer game, in accordance with some embodiments of the disclosure. In some embodiments, the server 102 may generate table 700 by analyzing gaming logs 118 from a large set of gaming devices 104 to identify how different hardware configurations affect in-game performance of the multiplayer video game. As shown, table 700 may have different score advantages representing the additional points that a user will typically add to their score if they upgrade/add/change a hardware component (e.g., with respect to aggregated performance score 602 shown in FIG. 6). For example, as shown, if a user upgrades their current display having a response time above 7 m to a display having a response time between 3-7 ms, that user can expect to add two points to their score. As shown, some types of upgrades may have a greater or lesser impact than other upgrades. Also, some upgrades may not have any effect on a user's aggregated performance score. For example, while a "mouse" and a "joystick" share a plus-one point advantage over a "keyboard," they do not have an advantage with respect to each other.

In some embodiments, server 102 may analyze the effect of changes in a hardware configuration of a gaming device 104 (e.g., scores before and after a component is upgraded). In embodiments, server 102 may retrieve table 700 from a database (e.g., gaming logs/gaming device data database 112). Periodically, when additional gaming logs are available, table 700 may be updated.

The processes discussed above are intended to be illustrative and not limiting such that steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving first user performance data of a first user and second user performance data of a second user, wherein the first user performance data is based at least in part on the first user's performance within a multiplayer game using a first user device with a first software configuration and the second user performance data is based on the second user's performance within the multiplayer game using a second user device with a second software configuration;
determining, by control circuitry, based at least in part on the first user performance data and the second user performance data, that a performance aspect of the first user in the multiplayer game is worse than the performance aspect of the second user in the multiplayer game, wherein the performance aspect of the first user comprises at least one game-specific metric by which player in-game performance is measured against the in-game player performance of another player;
based at least in part on the determining that the performance aspect of the first user in the multiplayer game is worse than the performance aspect of the second user in the multiplayer game:
identifying, by the control circuitry, a first software setting in the first software configuration of the first user device;
identifying, by the control circuitry, a second software setting in the second software configuration of the second user device;
accessing, by the control circuitry, in a previously stored configuration data structure comprising gaming advantage values for a plurality of software settings, a first gaming advantage value corresponding to the first software setting, wherein the first gaming advantage value indicates an effect on player gameplay of the first software setting;
accessing, by the control circuitry, in the previously stored configuration data structure, a second gaming advantage value corresponding to the second software setting, wherein the second gaming advantage value indicates the effect on the player gameplay of the second software setting;
determining, by the control circuitry, that the second gaming advantage value exceeds the first gaming advantage value;
generating, by the control circuitry, for display, on a device associated with the first user, a recommendation comprising an indication of the second software setting based at least in part on the determining that the second gaming advantage value exceeds the first gaming advantage value; and
causing a change of the second software setting based at least in part on the recommendation.

2. The method of claim 1, wherein the recommendation further comprises an identity of the second user.

3. The method of claim 1, wherein the recommendation comprises a proposed update of the first software setting.

4. The method of claim 1, wherein the recommendation comprises identifying a software setting of the second software configuration as not being used by the first software configuration.

5. The method of claim 1, wherein the recommendation comprises a weblink to a software component.

6. The method of claim 1, wherein the first software setting is an in-game characteristic selectable in the multiplayer game, and the recommendation comprises a change in the in-game characteristic.

7. The method of claim 1, wherein the first software setting and the second software setting control analogous components, respectively, in the first software configuration and the second software configuration.

8. The method of claim 1, wherein the generating for the display on the device associated with the first user comprises causing the display for the first user device.

9. The method of claim 1, wherein the performance aspect comprises a game win by a player, a game loss by the player, a success in an in-game challenge by the player, a player failure in the in-game challenge, a number of player challenges completed, one or more in-game kills by the player, one or more in-game player deaths, one or more player completions of a game level, a player obtaining one or more in-game characters, the player reaching one or more in-game scenes, a time to complete one or more game levels by the player, in-game player health data, ammunition used by the player, aggregate player performance score or a player damage score.

10. The method of claim 1, further comprising:
receiving user interface input requesting acceptance of the recommendation, wherein the causing the change of the second software setting is based at least in part on the receiving user interface input requesting acceptance of the recommendation.

11. A system comprising:
a memory storing a configuration data structure comprising gaming advantage values for a plurality of software settings; and
control circuitry configured:
to receive first user performance data of a first user and second user performance data of a second user, wherein the first user performance data is based at least in part on the first user's performance within a multiplayer game using a first user device with a first software configuration and the second user performance data is based on the second user's performance within the multiplayer game using a second user device with a second software configuration;
to determine, based at least in part on the first user performance data and the second user performance data, that a performance aspect of the first user in the multiplayer game is worse than the performance aspect of the second user in the multiplayer game, wherein the performance aspect of the first user comprises at least one game-specific metric by which player in-game performance is measured against the in-game player performance of another player;
based at least in part on the determining that the performance aspect of the first user in the multiplayer game is worse than the performance aspect of the second user in the multiplayer game:
to identify a first software setting in the first software configuration of the first user device;
to identify a second software setting in the second software configuration of the second user device;
to access, in a previously stored configuration data structure comprising gaming advantage values for a plurality of software settings, a first gaming advantage value corresponding to the first software setting, wherein the first gaming advantage value indicates an effect on player gameplay of the first software setting;

to access, in the previously stored configuration data structure, a second gaming advantage value corresponding to the second software setting wherein the second gaming advantage value indicates the effect on the player gameplay of the second software setting;

to determine that the second gaming advantage value exceeds the first gaming advantage value;

to generate for display, on a device associated with the first user, a recommendation comprising an indication of the second software setting based at least in part on the determining that the second gaming advantage value exceeds the first gaming advantage value; and to cause a change of the second software setting based at least in part on the recommendation.

12. The system of claim 11, wherein the recommendation further comprises an identity of the second user.

13. The system of claim 11, wherein the recommendation comprises a proposed update of the first software setting.

14. The system of claim 11, wherein the recommendation comprises identifying a software setting of the second software configuration as not being used by the first software configuration.

15. The system of claim 11, wherein the recommendation comprises a weblink to a software component.

16. The system of claim 11, wherein the first software setting is an in-game characteristic selectable in the multiplayer game, and the recommendation comprises a change in the in-game characteristic.

17. The system of claim 11, wherein the first software setting and the second software setting control analogous components, respectively, in the first software configuration and the second software configuration.

18. The system of claim 11, wherein the generating for the display on the device associated with the first user comprises causing the display for the first user device.

19. A non-transitory computer-readable medium comprising instruction that when executed by a processor cause the processor:

to receive first user performance data of a first user and a second user performance data of a second user, wherein the first user performance data is based at least in part on the first user's performance within a multiplayer game using a first user device with a first software configuration and the second user performance data is based on the second user's performance within the multiplayer game using a second user device with a second software configuration;

to determine, based at least in part on the first user game performance data and the second user performance data, that a performance aspect of the first user in the multiplayer game is worse than the performance aspect of the second user in the multiplayer game, wherein the performance aspect of the first user comprises at least one game-specific metric by which player in-game performance is measured against the in-game player performance of another player;

based at least in part on the determining that the performance aspect of the first user in the multiplayer game is worse than the performance aspect of the second user in the multiplayer game:

to identify a first software setting in the first software configuration of the first user device;

to identify a second software setting in the second software configuration of the second user device;

to access, in a previously stored configuration data structure comprising gaming advantage values for a plurality of software settings, a first gaming advantage value corresponding to the first software setting, wherein the first gaming advantage value indicates an effect on player gameplay of the first software setting;

to access, in the previously stored configuration data structure, a second gaming advantage value corresponding to the second software setting, wherein the second gaming advantage value indicates the effect on the player gameplay of the second software setting;

to determine that the second gaming advantage value exceeds the first gaming advantage value;

to generate for display, on a device associated with the first user, a recommendation comprising an indication of the second software setting based at least in part on the determining that the second gaming advantage value exceeds the first gaming advantage value; and to cause a change of the second software setting based at least in part on the recommendation.

20. The medium of claim 19, wherein the first software setting is an in-game characteristic selectable in the multiplayer game, and the recommendation comprises a change in the in-game characteristic.

* * * * *